United States Patent Office

Re. 26,042
Reissued June 14, 1966

26,042
METHOD FOR PRODUCTION OF METAL FABRICATIONS

John J. Grebe and John F. Miller, Midland, Mich., assignors to The Dow Chemical Company, Midland, Mich., a corporation of Delaware No Drawing. Original No. 3,201,228, dated Aug. 17, 1965, Ser. No. 216,296, Aug. 13, 1962. Application for reissue Sept. 30, 1965, Ser. No. 492,366
7 Claims. (Cl. 75—33)

Matter enclosed in heavy brackets [ ] appears in the original patent but forms no part of this reissue specification; matter printed in italics indicates the additions made by reissue.

This application is a continuation-in-part of application Serial No. 113,657, filed May 31, 1961, now abandoned, which in turn is a continuation-in-part of application Serial No. 823,155, filed June 26, 1959, now Patent No. 2,990,267.

This invention is concerned with an improved method for preparing formed metal products. It more particularly relates to a method for the production of metal and alloy products from metals having co-produced therewith an alkali metal silicate, glass-like protective slag.

The method of the present invention has as its principal object the preparation of metal products by hot working sponge or particulate metals formed by low temperature reduction of metal ore or metal oxides in the presence of a co-produced alkali metal silicate glass-like slag.

A further object of the present invention is to provide high-grade metal fabrications starting from low quality readily available oxidized metal value containing materials.

Another object of the present invention is to provide metal fabrications which are produced directly from the reaction products resulting from the reduction of ores or other materials containing oxidized forms of metals which are reducible by the method of the instant process.

It is still another object of the present invention to provide a method for preparing alkali metal silicate glass-like slag along with a reduced metallic product which slag can be reclaimed and economically converted into useful, commercially important products.

It is also an object of the present invention to provide a metal reduction process whereby there is substantially complete elimination of undesirable contaminating gases from the metal product because of coproduction of the alkali metal silicate glass slag which envelopes the metallic product as produced thereby preventing atmospheric contamination.

An additional object of the present invention is to provide a method for producing fabricated metal products wherein a protective glass-like coating is formed and bonded to the outer metal surface or throughout the fabrication during the forming operation.

It is another object of the present invention to introduce alkali metal oxide scavengers into a metal producing composition without encountering undesirably high losses from volatilization.

It is still a further object of the present invention to provide an economical metal winning process where extra heat is obtained from exothermic reactions during the reduction process.

These and other objects and advantages will be recognized by one skilled in the art from the detailed description of the invention presented hereinafter.

The combination of steps as practiced in the method of this invention comprises, in general, mixing a comminuted metal ore or material containing reducible metal values and a silicate slag fluxing agent with finely divided carbonaceous material or other reducing agent and an alkali metal oxide or oxide former, i.e., alkali metal hydroxide, for example. Sufficient molar proportions of the ore and reducing agent are used to insure substantially complete reduction of the metal to the metallic state and sufficient quantities of alkali metal oxide or oxide former and silicate fluxing agent are employed to insure formation of a continuous, fused glass-like slag. This mixture is heated at temperatures within the range of from about 450° centigrade to about 1225° centigrade for a time sufficient to achieve simultaneous reduction of the metal values in the ore and production of the alkali metal silicate glass-like slag. During this period, the reduction is aided by exothermic reactions involving the alkali metal values. The resulting hot product mass, comprised of discrete solid substantially gas-free metallic particles or sponge metal encased in a plastic glass-like slag is then hot worked.

The term hot working as used herein is meant to include both mechanical working and molten melting forming operations such as melting, casting and the like.

The mechanical hot working or forming operations can be carried out by any of a number of hot working processes including, for example, hammer forging, hot rolling, hydraulic press forging, mechanical press forging, upsetting, extruding, roll forging, die rolling, hot deep drawing, swaging, rotary swaging and the like. In this process the metal treatment is carried out at a temperature at which the glass remains molten thereby compacting and forming the metal while in the presence of the protective glass-like slag. For some fabrication several of the above-mentioned processes can be used in combination to produce the desired product form. The instant process which is suitable for fabricating a wide variety of metals finds particular utility in the preparation of iron based fabrications.

The type and amount of mechanical hot working to be carried out on the hot product mass will vary depending on the desired form of the metal product and the characteristics and properties of the metal itself. To illustrate, a small amount of working, for example hammer forging, can produce, from sponge iron produced by the reduction process of the instant invention, a core wherein the iron network is surrounded by an inert glass-like slag coating which upon cooling hardens into a protective substantially pore free coating. Continued or extended forging of the hot metal sponge-plastic glass-like slag coproducts for longer periods produces a silicate glass fiber-reinforced compacted iron core for example. Still further kneading, folding, hammering and squeezing of the product mixture by the forging operation leads to a dense compact iron core and extruding of the molten glass-like co-product to the outside of the formed mass. These latter two mentioned products readily lend themselves to extrusion practices as the glass coating and/or fibers contained therein serve as an excellent die lubricant.

The metal sponge product encased in its protective glass-slag also can be introduced into conventional melting furnaces and taken into the molten state whereupon the metal can be cast into ingot form or other predetermined shapes or otherwise utilized in molten metal forming operations. For such operations, ordinarily the bulk of the protective alkali metal silicate glass from the low temperature forming operation is removed prior to the melting operation. Conveniently, this is merely poured off as this slag usually is molten or can be made molten at metal sponge forming temperatures. Only a relatively small amount of the slag which encases the sponge as produced is necessary to provide a good protective cover for the charge during the subsequent melting operation.

Although the sponge, a solid particulate metal product mass, as produced can be employed directly for subsequent melt operation, also it is to be understood that because of its protective alkali silicate glass coating it can readily be stored, shipped or otherwise handled prior to its use in melting and coating operations.

The initial sponge or particulate metal product mass also lends itself readily to other hot working operations. For example, a metal billet which has been forged or swaged to an extent that some glass fibers remain in the billet readily can be extruded. The glass-like slag fiber inclusions act as a die lubricant during the forming operation, and, in the extruded product serve to add to the strength and corrosion resistance of the formed product. Also, extrusion of a forged or upset ingot, wherein substantially all of the slag has been forced to the outside and remains there as a surface coating, leads to production of glass coated pipe, conduit and other structural members. Such members, the surfaces of which are substantially inert to a wide variety of corrosive atmospheres and environments, can find use in a wide variety of applications which have need for light weight and long lived structural elements.

Hot rolling of the product mass can produce a metal sheet having essentially a porcelain-type coating integrally produced during the rolling operation.

In any of the above-mentioned applications wherein the glass-like protective coating is produced on the metal surface, such coating can be given a decorative effect by incorporating pigments, such as are used in glazing and porcelainizing operations, into the mass prior to the hot working.

Although the instant process is particularly adaptable to the production of surface protected fabrications, as has been set forth hereinbefore, the metal can be worked to remove substantially all of the slag therefrom. In the continued mechanical working of the product mass, the glass-like slag product becomes heated to successively higher temperatures thereby becoming less viscous and less dense. It is readily squeezed to the surface of the metal compact and finally is substantially removed from within the metal compact. In this operation, the continuous exudation of the glass from the compact, during the hot working, serves to protect the metal from oxidation. In melting operations the less dense molten protective glass is poured or otherwise separated from the molten charge before coating, e.g. in accordance with standard foundry and molten metal handling techniques.

In carrying out the low temperature metal reduction stage of the process of the instant invention many of the metal ores, as mined, or metal containing materials advantageously will contain varying amounts of silica or other siliceous material such as complex silicates and the like. However, in many cases these silicon containing, glass forming, fluxing materials are not present or are present in extremely small amounts. If these are not present in sufficient quantities for production of the glass-like slag, excess silicon dioxide in the form of sand or powdered quartz can be added to the mix. Production of the slag itself results from reaction of silicon dioxide and/or other silicate glass forming fluxing agents present with the alkali metal oxide former used in the mix. Potassium-sodium-and lithium hydroxide or the corresponding carbonates all have been found to be suitable for this application although sodium hydroxide is preferred. The alkali metal hydroxide, which can contain the impurities found in commercial grades of the product, is used in any of a number of forms including substantially dry flake, paste or as an aqueous solution.

The reducing agent normally used in the process is carbon or a material having a high free carbon content. Soft coal and lignite, both of which are plentiful and inexpensive, have been found to work very satisfactorily as reducing agents in the method of the invention. However, other reductants which can be employed include metals such as sodium, calcium, potassium, lithium, magnesium and silicon, carbon-containing compounds, certain metal salts or hydrides and the like.

The reaction temperatures to be employed in the preparation of the reduced metal containing product mass can range from about 450° centigrade to about 1225° centigrade and reaction time can vary from about 1 to about 180 minutes and more, this time depending both on the reaction temperature employed and metal being produced. In any event the reaction will be carried out at a temperature at which the metal remains in a solid but plastically deformable form during the reduction step.

The time of reaction to achieve metal reduction will vary in an inverse manner to the temperature employed. For example, iron oxide can be reduced to metallic iron by reaction at about 1225° centigrade for about 25 minutes while a reaction time of about 180 minutes is required at temperatures of about 900° centrigrade. For the different metals, it will be recognized that both reaction times and temperatures are dependent on the properties of these individual metals. The elements whose standard electrode potentials approach more closely those of the noble metals can be reduced with considerably greater ease—lower temperatures and reaction times than those elements near the upper temperature limits of application of the invention, namely manganese, chromium and the like.

It readily is understood that the process is suitable for use not only in the production of a given metallic element, but by a predetermined selection of metal oxides that solid metal alloys are produced directly in the low temperature reduction step.

Illustrative of an embodiment of this invention is a method for the production of finely divided or sponge iron encased in a glass-like slag and the subsequent hot working of the metal-slag mass by hammer forging. For this process, the reaction mixture was prepared by mixing a comminuted iron containing ore (selected from ores ranging in iron content from that of the high quality hermaties [60–65% iron] to the lowest grade taconites [15–25% iron]) either in the presence or absence of excess silica, that is silica in excess of that provided by the gangue material, with a finely divided carbonaceous material and an alkali metal hydroxide. The preferred operating compositions of the reaction mixture preferably fall within the range of 0.05 to 3.0 moles of silicon dioxide, 1.0 to 3.0 moles of carbonaceous material and 0.3 to 4.0 moles of the alkali metal hydroxide per mole of the iron oxide content of the ore although effective conversion of the ores into metallic iron can be obtained even though the reaction is run using compositions outside this range.

The reaction components described above were mixed thoroughly in a conventional mixer, then placed preferably in a melting pot or crucible and transferred to a furnace. This furnace conveniently can be either electrically heated and supplied with a protective atmosphere such as nitrogen, helium, argon or even the carbon monoxide itself present in the reacting system. Alternatively, the furnace can be gas fired. In the latter case, excess fuel gas along with the combustion product gases provide the mixture with a natural protective atmosphere. As an alternate to this bath type operation, the mix can be fed from the mixer at a continuous, controlled rate onto a moving grate so timed as to give the desired reduction and dispersion of the metallic particles in a single pass through the furnace. The reaction mixture was heated within the range of about 900° to about 1225° C. for a period from about 30 to about 180 minutes, and, preferably at about 1100° centigrade for about 30 to 40 minutes. The resulting soft, sponge iron and glass-like slag product then was subjected to kneading, folding and squeezing by the pounding action of the forging process. As this forging operation proceeds, the low melting slag was forced to the outside of the mass and a dense, compact substantially solid iron core resulted. Ordinarily, no additional external heat need be supplied during the forking operation as the friction and kinetic energy supplied during the hot working itself may be sufficient to keep the slag fluid and the iron in a workable state. Such hot working also can give desirable random distribution of the stress forces in the resulting fabrication.

The following examples will serve to further illustrate the present invention.

EXAMPLE 1

Ground taconite ore, 951.9 grams (containing approximately 3 moles $Fe_2O_3$, based on 50 percent $Fe_2O_3$ in ore, and approximately 6 moles $SiO_2$, based on 39 percent $SiO_2$ in ore), 107.8 grams (equivalent to approximately 9 moles of carbon) of ground soft coal and 494 grams (approximately 12 moles) of flake sodium hydroxide were thoroughly mixed and placed in a clay graphite crucible. The crucible and contents were placed in gas fired furnace and held at about 1210° C. for about 35 minutes. After this time, the crucible was removed from the furnace and a portion of the lower density glass-like slag was poured from the top of the crucible. The remainder of the sponge iron-plastic slag mixture was removed from the crucible as an integral mass.

The hot mass was worked by hammering following a general procedure as employed in the hammer forging operations. The working of the mass was continued until the metal sponge was compacted into a dense substantially solid core. During this operation, the slag, originally entrapped within and surrounding the metal sponge, was squeezed to the outside of the resulting iron billet.

In a second run utilizing the same mix and reaction conditions, the iron sponge-plastic slag produced was hammer-forged in the same manner as described heretofore but the action was discontinued before the dense substantially solid core of metal was produced. The billet was cut into sections. Examination of the exposed cross-section indicated the billet was composed of a network of glass-like fibers tenaciously bonded to the partially compacted metal.

In a third run utilizing the same mix and reaction conditions, the iron sponge with its coating of protective alkali metal silicate glass was placed in a crucible and melted. The molten iron was cast into a mold using standard foundry techniques. Examination of the cast product showed substantially no slag inclusions or voids therein.

EXAMPLE 2

A mixture of iron ore, carbon and caustic was prepared as set forth in Example 1. After mixing, about 10 percent water, based on the total weight of the mixture, was blended into the batch and this resulting moist mix extruded into a ribbon about 0.5 inch wide and about 0.25 inch thick. A length of ribbon was placed in a graphite boat and this introduced into a preheated electric furnace maintained at about 1220° C. The mix was heated for about 30 minutes. After this time the heated ribbon was removed from the furnace and while hot was hammer forged and swaged into a predetermined compacted shape. Examination of the product after compaction indicated the fabrication was substantially of solid metal having a few fibers of glass dispersed throughout the structure.

EXAMPLE 3

Ground nickel oxide (NiO), 500 grams, about 25 grams of $SiO_2$, about 33.3 grams of flake sodium hydroxide and about 23.5 grams of ground soft coal were thoroughly mixed and placed in a clay graphite (Plumbago) crucible. This mix gave a $Na_2O/SiO_2$ equivalent gram molar ratio of 1 and a NiO/C gram molar ratio of 1.

The crucible and contents were placed in a gas-fired furnace at about 400° C. The furnace was then heated to a temperature of about 1220° C. over a period of about 35 minutes and maintained above 1200° C. for about 40 minutes additionally. Following the reaction period, the crucible was removed from the furnace and the bulk of the less dense alkali metal silicate poured off. The metal sponge encased in a protective coating of the glass, which served to substantially eliminate the formation of undesirable gas inclusions in the metal product, was transferred to a second crucible and placed in an electric resistance furnace. The furnace was heated and the nickel transformed into the molten state. The metal first collected as small beads. These coalesced into larger beads and then into a solid mass. The residual glass coating, being less dense remained in a molten layer on top of the metal during the melting serving as a protective layer. The molten metal then was transferred into a mold and cooled.

EXAMPLE 4

Using the same techniques and procedures as described for Example 3, metallic cobalt was prepared from a charge consisting of about 500 grams ground CoO, about 17.6 grams $SiO_2$, about 23.4 grams flake sodium hydroxide and about 56.4 grams powdered soft coal.

EXAMPLE 5

Using the same techniques and procedures as described for Example 3, metallic manganese was prepared from a charge consisting of about 500 grams manganese bearing ore ($SiO_2$ present in the native ore 4.5%), about 30 grams flake sodium hydroxide and about 29.6 grams powdered soft coal.

EXAMPLE 6

A mixture of about 2 parts by weight nickel oxide, 1 part by weight copper oxide along with small amounts of iron oxide and manganese oxide can be mixed and these reacted with the requisite amounts of $SiO_2$, $Na_2O$ values and carbon to produce directly a Ni–Cu based alloy by following the procedures of the present process.

In a manner similar to that shown in the foregoing examples, and using the corresponding metal ore, silica, carbonaceous material and alkali hydroxide, zinc can be obtained from its ore by heating for a sufficient period at a temperature of about 1225° centigrade. Similarly, lead can be produced at a temperature about 450° centigrade.

Although these examples have merely shown preferred embodiments of this invention, it is also understood that other oxidized metal compounds can be utilized in this process to produce a wide variety of formed metals whose standard electrode potentials range from about 1.2 to about minus 0.85, including tellurium, zinc, chromium, gadolinium, cadmium, indium, thallium, cobalt, nickel, tin, antimony, bismuth, arsenic, copper, silver and the like. Furthermore, by using mixtures of the oxidized metal compounds, alloys also can be produced directly.

Various modifications can be made in the method of the present invention without departing from the spirit or scope thereof and it is understood that we limit ourselves only as defined in the appended claims.

We claim:

1. An improved method for the production of metal products of those metallic elements having a standard electrode potential falling between about 1.2 and about minus 0.85, which comprises: contacting an oxidized form of said metal selected from the group consisting of comminuted metal ores and materials containing reducible metal values and silicate glass forming fluxing agent with *a member selected from the group consisting of* [an] alkali metal [hydroxide] *oxides or oxide formers,* and a solid carbonaceous reducing agent at temperatures from about 450 to about 1225° centigrade for a period of time sufficient to yield the solid metal substantialy free from undesirable gaseous inclusions suspended in a continuous, fused alkali metal silicate glass-like thermoplastic slag, separating the major portion of the less dense slag, while in the molten state, from the solid metal product, heating said solid metal product into the molten state whereby the metal is compacted into a continuous mass and the remainder of the protective alkali metal silicate glass-like slag enveloping said mass rises to the surface of the melt thereby providing a protective cover for the substantially gas-free metal during the melting operation, and casting said molten metal.

2. The process as defined in claim 1 wherein the metal product is an alloy prepared directly by providing a mixture of oxidized metals having a standard electrode potential falling between about 1.2 and about minus 0.85 as a reactant in the initial solid metal reduction step of said process.

3. A method for producing nickel products which comprises: contacting a nickel oxide containing material with *a member selected from the group consisting of* [an] alkali metal [hydroxide] *oxides or oxide formers,* a silicate glass forming fluxing agent and a solid carbonaceous reducing agent at a temperature of about 1200° C. for about 40 minutes thereby to produce directly solid sponge nickel in a protective alkali metal silicate glass, separating a portion of the glass while in the molten state from the nickel sponge, transferring the nickel sponge to a melting furnace, melting said nickel sponge and casting said nickel melt.

4. A method for producing cobalt products which comprises: contacting a cobalt oxide containing material with *a member selected from the group consisting of* [an] alkali metal [hydroxide] *oxides or oxide formers,* a silicate glass forming fluxing agent and a solid carbonaceous reducing agent at a temperature of about 1200° C. for about 40 minutes thereby to produce directly solid cobalt in a protective alkali metal silicate glass, separating a portion of the glass while in the molten state from the cobalt, transferring the cobalt to a melting furnace, melting said cobalt and casting said cobalt melt.

5. A method for producing manganese products which comprises: contacting a manganese oxide containing material with *a member selected from the group consisting of* [an] alkali metal [hydroxide] *oxides or oxide formers,* a silicate glass forming fluxing agent and a solid carbonaceous reducing agent at a temperature of about 1200° C. for about 40 minutes thereby to produce directly solid manganese in a protective alkali metal silicate glass, separating a portion of the glass while in the molten state from the manganese, transferring the manganese to a melting furnace, melting said manganese and casting said manganese melt.

6. An improved method for the production of hot worked iron fabrications which comprises: contacting a reducible iron compound with *a member selected from the group consisting of* [an] alkali metal [hydroxide] *oxides or oxide formers,* a silicate glass forming fluxing agent and a solid carbonaceous reducing agent at temperatures from about 900° to about 1225° centigrade for about 30 to about 180 minutes to yield a network of solid iron suspended in alkali metal silicate glass-like slag, mechanically hot working the so-produced hot product mass in the presence of said glass-like protective slag thereby compacting said iron into a fabrication of predetermined shape and continuing the hot working of the product mass until substantially all of the glass-like slag has been removed from the interior of the compacted fabrication.

7. An improved method for the production of fabricated iron products which comprises: contacting an iron ore with sufficient silica to make the content at least 0.05 mole, per mole of iron oxide present, sufficient solid carbonaceous material to make the content at least 1.0 mole per mole of iron oxide present and sufficient *amounts of a member selected from the group consisting of an* alkali metal [hydroxide] *oxides or oxide formers* to make the content at least 0.3 mole per mole of iron oxide present, heating the mixture at about 900° to about 1225° centigrade for about 30 to about 180 minutes in an inert atmosphere, working the resulting dispersion solid iron particles in the presence of coproduced alkali metal silicate fluid, viscous slag thereby compacting said iron and exuding the slag to the exterior of the so-worked compact.

References Cited by the Examiner

The following references, cited by the Examiner, are of record in the patented file of this patent or the original patent.

UNITED STATES PATENTS

| | | | |
|---|---|---|---|
| 2,684,296 | 7/1954 | Moklebust | 75—33 |
| 2,728,655 | 12/1955 | Brudin | 75—33 |
| 2,757,078 | 7/1956 | Edstrom | 75—33 |
| 2,767,087 | 10/1956 | Cavanagh | 75—33 |
| 2,839,397 | 6/1958 | Cavanagh | 75—33 |
| 2,880,083 | 3/1959 | Weinert | 75—33 |
| 2,990,267 | 6/1961 | Grebe et al. | 75—30 |

DAVID L. RECK, *Primary Examiner.*

H. W. TARRING, *Assistant Examiner.*